United States Patent

Chen

[11] Patent Number: 6,058,650
[45] Date of Patent: May 9, 2000

[54] PLANTING APPARATUS AND METHOD FOR GREEN PLANTS ON REINFORCED CONCRETE STRUCTURES

[76] Inventor: Chun Pu Chen, No. 2, Alley 6, Lane 39, Chin-Lin Rd., Yung-Ho City, Taipei Hsien, Taiwan

[21] Appl. No.: 08/992,273

[22] Filed: Dec. 17, 1997

[30] Foreign Application Priority Data

Dec. 31, 1996 [TW] Taiwan .................................. 85116310

[51] Int. Cl.[7] .................................................. A01G 31/00
[52] U.S. Cl. ............................. 47/62 R; 47/59; 47/62 A; 47/62 C; 47/62 E
[58] Field of Search .................................. 47/59, 60, 61, 47/62 A, 62 C, 62 E, 62 N, 62 R, 63, 64

[56] References Cited

U.S. PATENT DOCUMENTS

| | | | |
|---|---|---|---|
| 3,159,413 | 12/1964 | Silverman | 285/189 |
| 3,296,759 | 1/1967 | Pavlecka | 52/234 |
| 4,055,991 | 11/1977 | Bridwell | 73/73 |
| 4,397,114 | 8/1983 | Skaife | 47/81 |
| 4,468,885 | 9/1984 | Mandish | 47/59 |
| 5,557,884 | 9/1996 | Deppe | 47/62 |
| 5,724,768 | 3/1998 | Ammann, Jr. | 47/62 |

Primary Examiner—Michael J. Carone
Assistant Examiner—Son T. Nguyen
Attorney, Agent, or Firm—Bacon & Thomas

[57] ABSTRACT

Apparatus for planting green plants on reinforced concrete structures includes a T-shaped base mount having a positioning hole connected to an L-shaped tube and a high density sponge inside. The base mount is connected to a cylinder which includes a positioning hole connected to a T-shaped tube. A sand-releasing tube is connected at the bottom of the T-shaped tube and a funnel-connected snake-shaped tube is connected at the top. Another positioning hole on the cylinder is connected to an L-shaped air pipe. A cover plate having a hole at the center is attached to the top of the cylinder, the hole in the cover plate being connectable to a planting tube. The cylinder is connected to an anchor-shaped metal handle and a cylinder fixing frame so as to position the entire apparatus on steel rods within the reinforced concrete structure.

2 Claims, 9 Drawing Sheets

PLANTING APPARATUS AND METHOD FOR GREEN PLANTS ON REINFORCED CONCRETE STRUCTURES

BACKGROUND OF THE INVENTION

1. Field of the Invention

This invention concerns an apparatus for greening and planting, a method for combining a reinforced concrete structure with a greening and planting tool, and a greening and planting tool for use with a reinforced concrete structure. This invention and technique combines the reinforced concrete structure with greenery under the condition that no adverse effect occurs on the original functions and appearance of the reinforced concrete structure. It also increases the strength of reinforced concrete structure, so that the green plant can find a space inside the reinforced concrete structure to grow and to green the reinforced concrete structure. It also increases the aesthetic pleasure by adding a softness to the hard, cold steel and concrete jungle. Thus, the plant and the reinforced concrete structure can create a new environment filled with the beauty of nature (green, landscape), beauty of art (soft, architect, green oasis), and beauty of society (sophisticated, temperament).

2. Description of Related Art

According to the traditional planting technique, a space has to be reserved for the plant to flourish. Flowerbeds must be provided as oases in a desert of brick and concrete, or confined in flower pots. Since a large area is required, especially in a narrow urban area with a large crowd, fewer plants exist because of the economics, traffic or other factors that lead to this decreasing of space. The effect of reinforced concrete structures further forces reductions in the amount of plants due to the loss of growing space and poor growing conditions. If we can not grasp the modern need for light, thin, short and tiny, we will be confined to the old method which is certainly out-dated, decadent and should eventually be eliminated. This invention is committed to adjust the hard and cold status of a reinforced concrete structure to the softening beauty of environment under the condition that no adverse effect occurs on the functions and appearance of the structure while combining structure and greenery into one unit. This organic combination of a reinforced concrete structure with plants in harmony can create a new environment to benefit society and people.

SUMMARY OF THE INVENTION

The motivation of this invention is to reduce the effort of air pollution on the quality of environment, by providing space inside a reinforced concrete structure for a plant to grow by combining the growing tool and reinforced concrete structure into one unit. In a narrow and crowded urban area, "living" and "transporting" compress "green" together, leading to the drying up, shrinking and losing of the green world. This industrialized society pays so much attention to building up economics and traffic but not to the environment. The glorious buildings and wide roads reduce the space for plants, or remove and compress surface land and cause the density of development to increase. All these cause plants to lose out. Therefore, one must combine the plant with a reinforced concrete structure into one unit, to create a new environment, to seek a culture of green, to build-in a haven for greenery, and to cause the environment to work in harmony with the build-up of economics and traffic to contribute more to the society and people.

In order to address the modern need for "light", "thin", "short" and "tiny", we combine a tool with a reinforced concrete structure into one unit to provide a space inside the reinforced concrete structure for the plant's growth. This innovation is a breakthrough of traditional greening and planting, and is an engineering leap forward to improve the actual quality of the environment, lower the reflection of radiation, reduce harmful rays, reduce pollution of air and noise, and even raise the visual pleasure with less space and the lowest cost, to receive the most greening reaction and leave a prosperous land for our next generations by maintaining a good health.

BRIEF DESCRIPTION OF THE DRAWINGS

The invention, as well as its many advantages, may be further understood by the following detailed description and drawings, in which.

Tables 1 and 2 show the actual surveyed figures of the water capacity in soil for the preferred tool.

Symbols are clarified as follows:

(1) Cylinder
(2) T-shape base mounts
(3) Top cover plate
(4) Planting opening
(5) Indented trough
(6) Funnel
(61) Funnel opening
(7) Snake-shape tube
(8) L-shape water level adjustment tube
(81) Opening of water level adjustment
(9) High density sponge
(10) Fixing frame
(11) Anchor
(12) Handle
(13) Regulating hole for water level adjustment
(131) Regulating hole for permeating waters
(132) Regulating hole for air pipe
(15) L-shape planting tube
(16) L-shape air pipe
(161) Opening for air
(17) L-shape sand-releasing tube
(171) Sand-releasing opening
(18) T-shape connecting tube
(19) Tube wrapper
(20) Wall-face
(21) Protecting fence
(22) Tool.

DETAILED DESCRIPTION OF THE PREFERRED EMBODIMENTS

Details are shown in FIGS. 1A, 1B, 2, and 3. This invention is to provide a tool that can be combined with a reinforced concrete structure as shown to permit a small tree, shrub and climbing plants to be planted in the reinforced concrete structure.

The tool (22) includes a cylinder (1) formed by a plastic hollow shell arranged to be filled with soil and to retain water, nutrition and air for use in the plant's growth. There is a groove (5) on the internal wall of cylinder (1) (FIG. 2) which serves to provide a capillary function for soil water inside the cylinder to enhance the growth of a plant's root. A high-density sponge (9) is placed inside the T-shape base mount (2) to retain water and prevent lost soil. Stored permeating water provides water for the plant to grow for a long time. At the top of the T-shape base mount is a regulating hole (13) at a suitable position which connects the L-shape water level adjustment tube (8) to adjust the water level of the high density sponge inside the T-shape base mount. The cylinder (1) has a regulating hole for permeating water (131) at a suitable position, which connects the T-shape connecting tube (18). The top of connecting tube (18) is joined to the snake-shape tube (7) to conduct the air and permeating water and also condense the water evaporated from soil. The bottom of the T-shape connecting tube (18) joins an L-shape sand-releasing opening (171). The snake-shape tube (7) joins a funnel to increase the permeating surface to collect more permeating water. The air pipe regulating hole (132) is linked to an L-shape air pipe (16), which is especially for conducting air to increase the air capacity of soil. The cover plate (3) reduces the evaporation of soil water. There is a planting opening on the cover plate to plant a green plant. The L-shape planting curb tube (15) is especially for the use of a climbing plant during wall planting, while the cover (3) can change the direction of a planting opening (4) so the planting opening and wall will face downward.

The fixed frame (10) in this invention is fixed around the cylinder (1) with an iron ring. It also increases the area and strengthens the combining integrity of the reinforced concrete structure. A U-shape iron is welded with the top of two fixed frames (10) to form an anchor (11). These two horizontally welded anchor (11) and the handle (12) can be carried and fixed easily on the steel rods inside the reinforced concrete structure, so the cylinder (1) will not float or be moved by buoyancy during the pouring of concrete. Moreover, it increases the strength of the whole reinforced concrete structure.

Figure 1A:
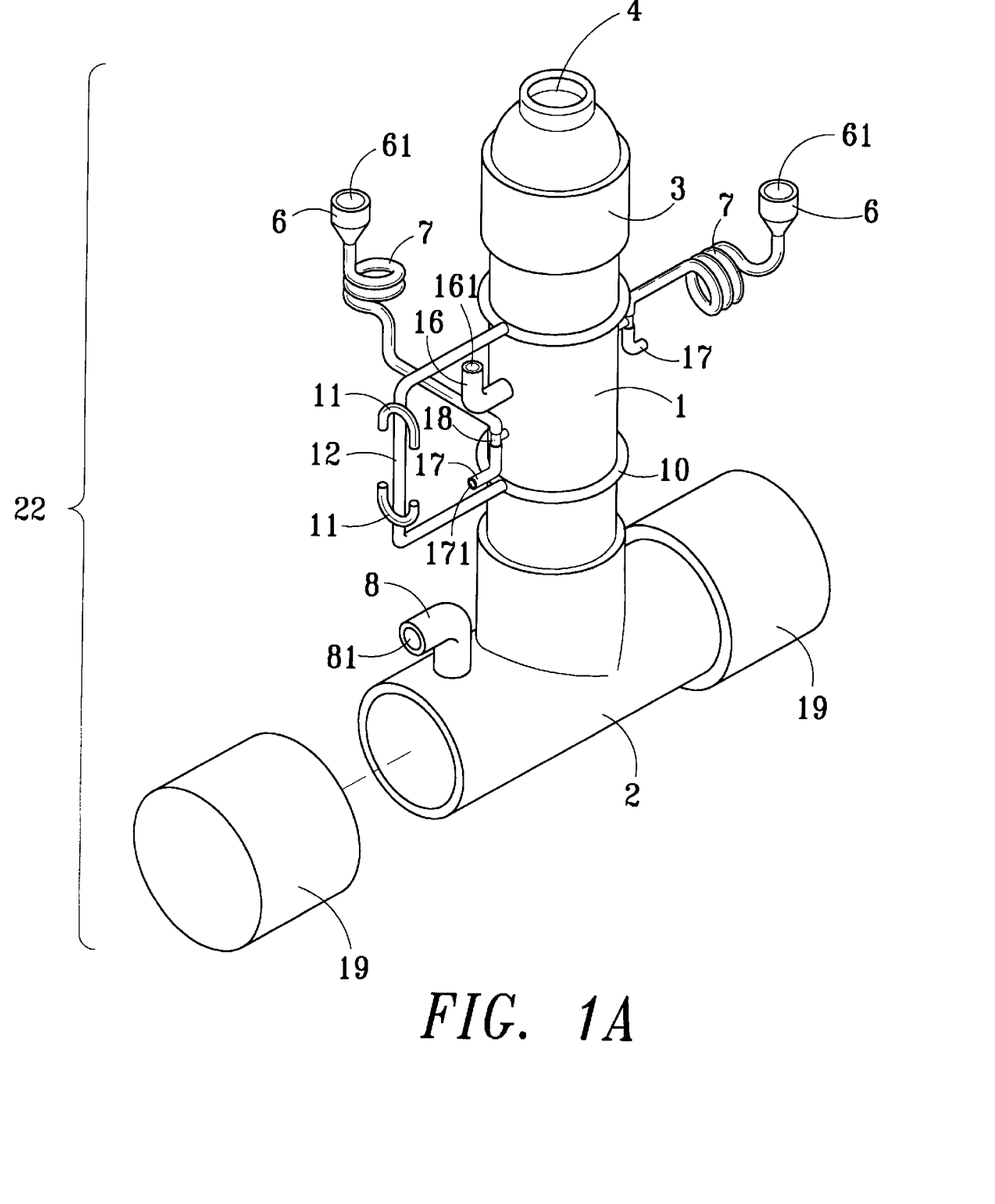
FIG. 1A is an isometric view of a preferred greening and planting tool.
Figure 1B:
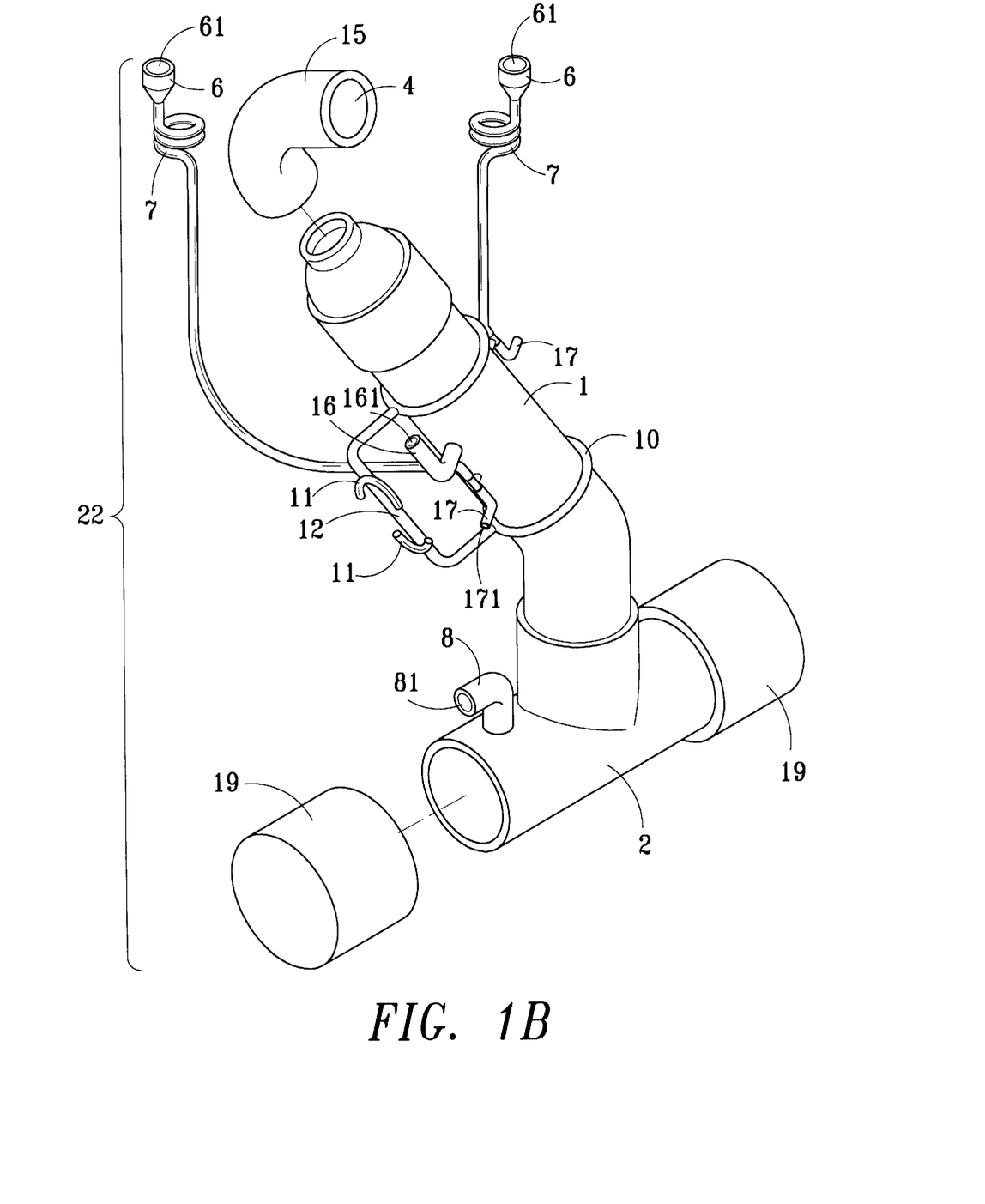
FIG. 1B is an isometric view of the preferred tool.
Figure 2:
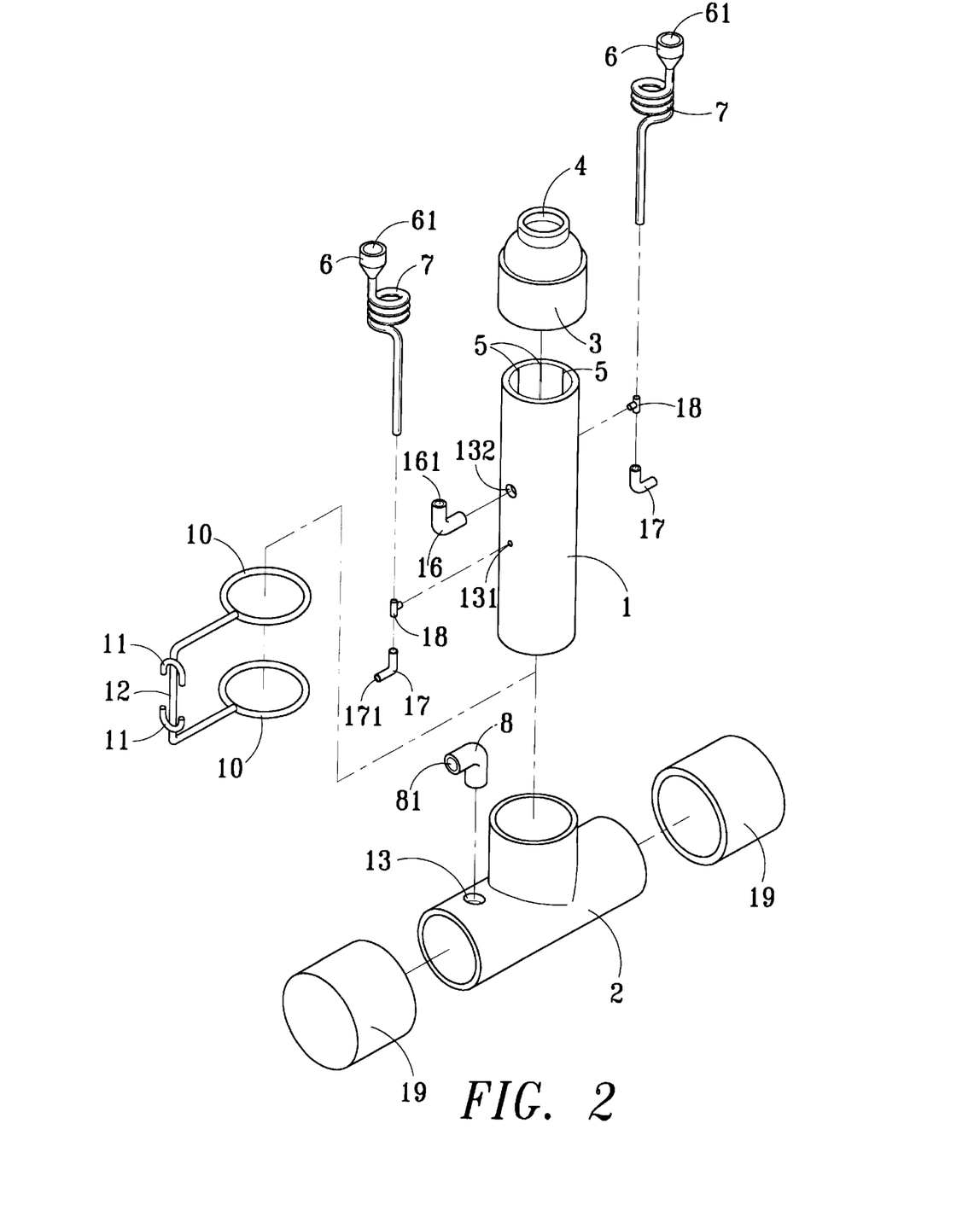
FIG. 2 is an exploded view of the preferred tool.
Figure 3:
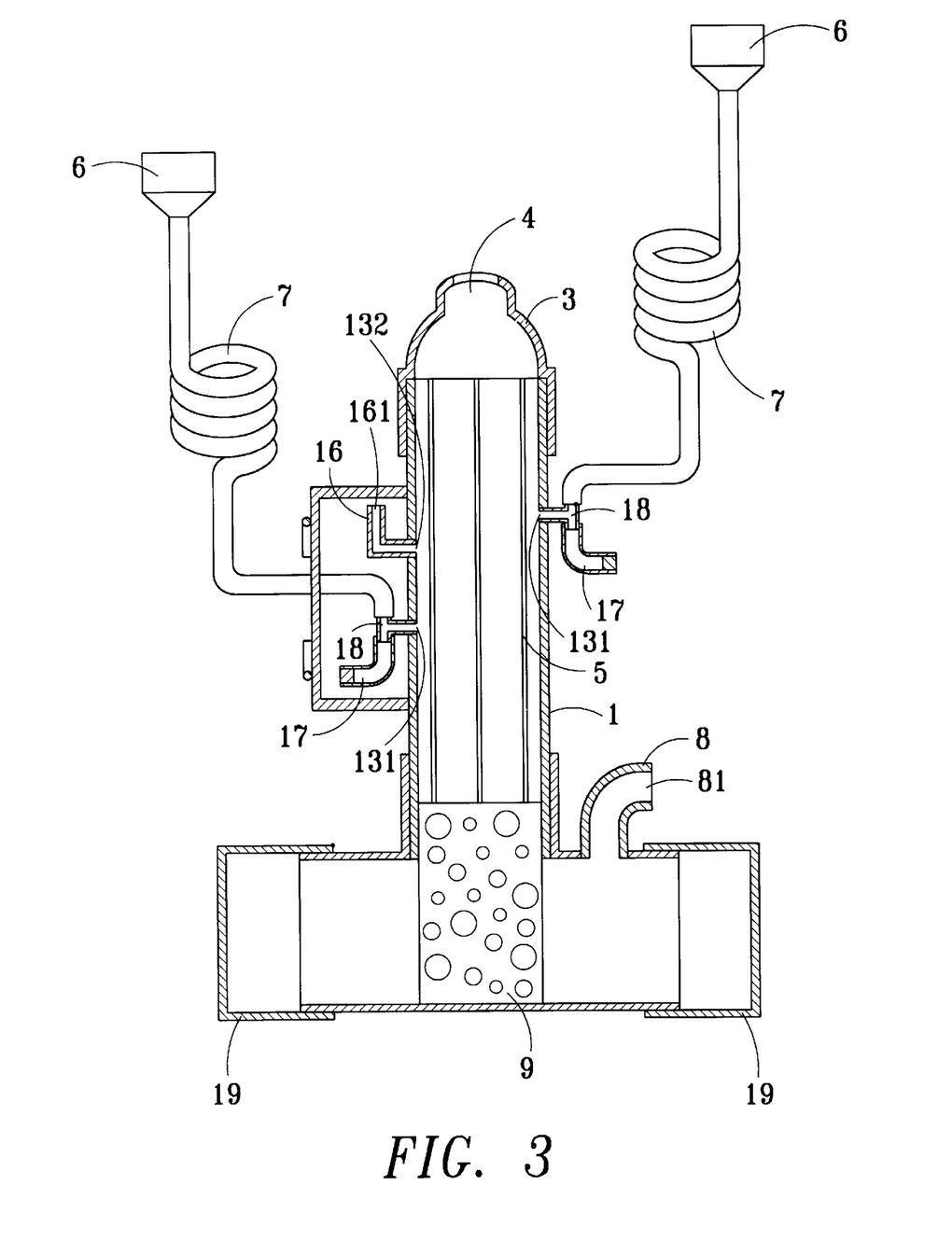
FIG. 3 is a cross-sectional side view of the preferred tool.
Figure 4A:
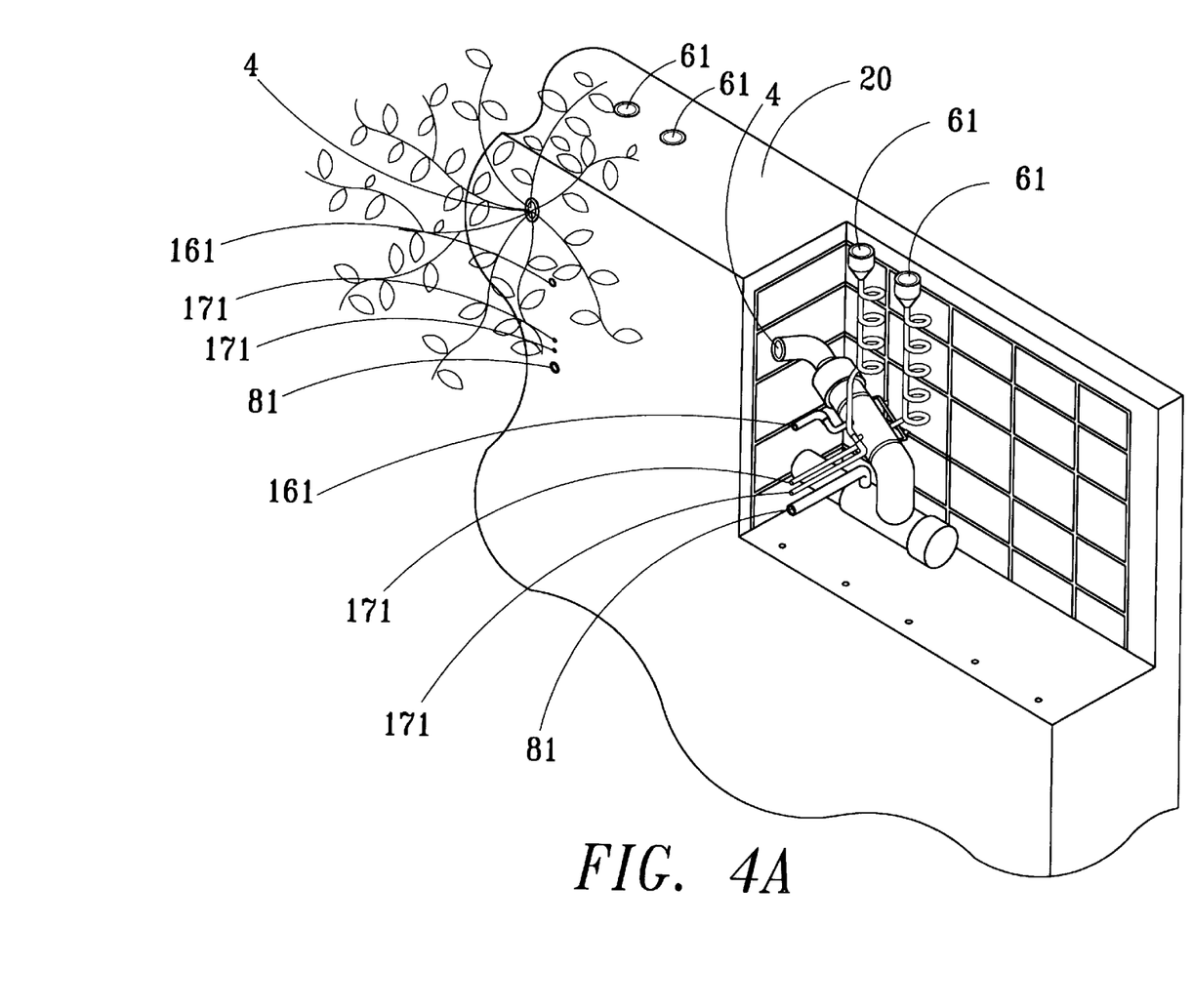
FIG. 4A is an isometric view of a wall including the preferred greening and planting tool.
Figure 4B:
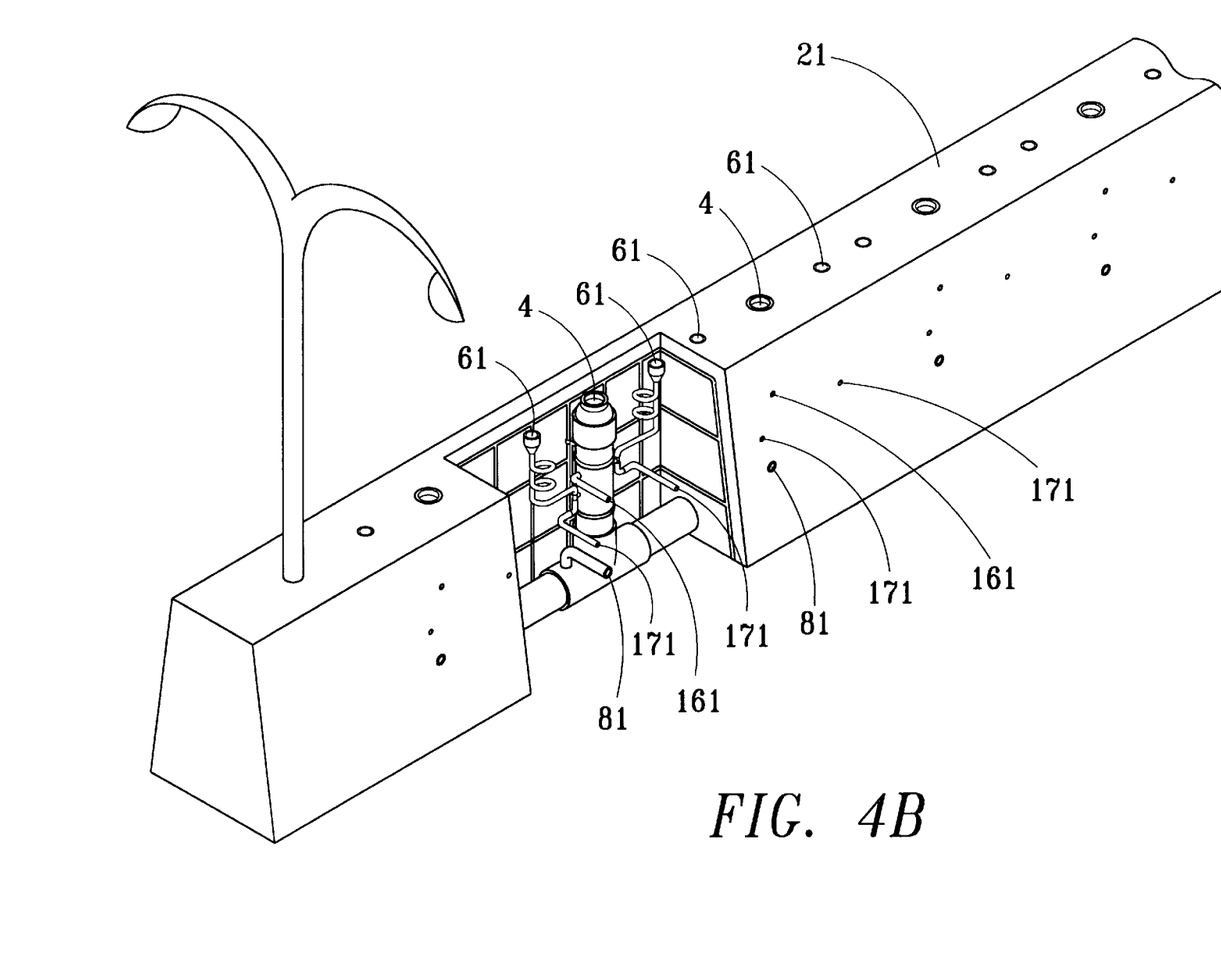
FIG. 4B is an isometric view of a stand including the preferred tool.
Figure 4C:
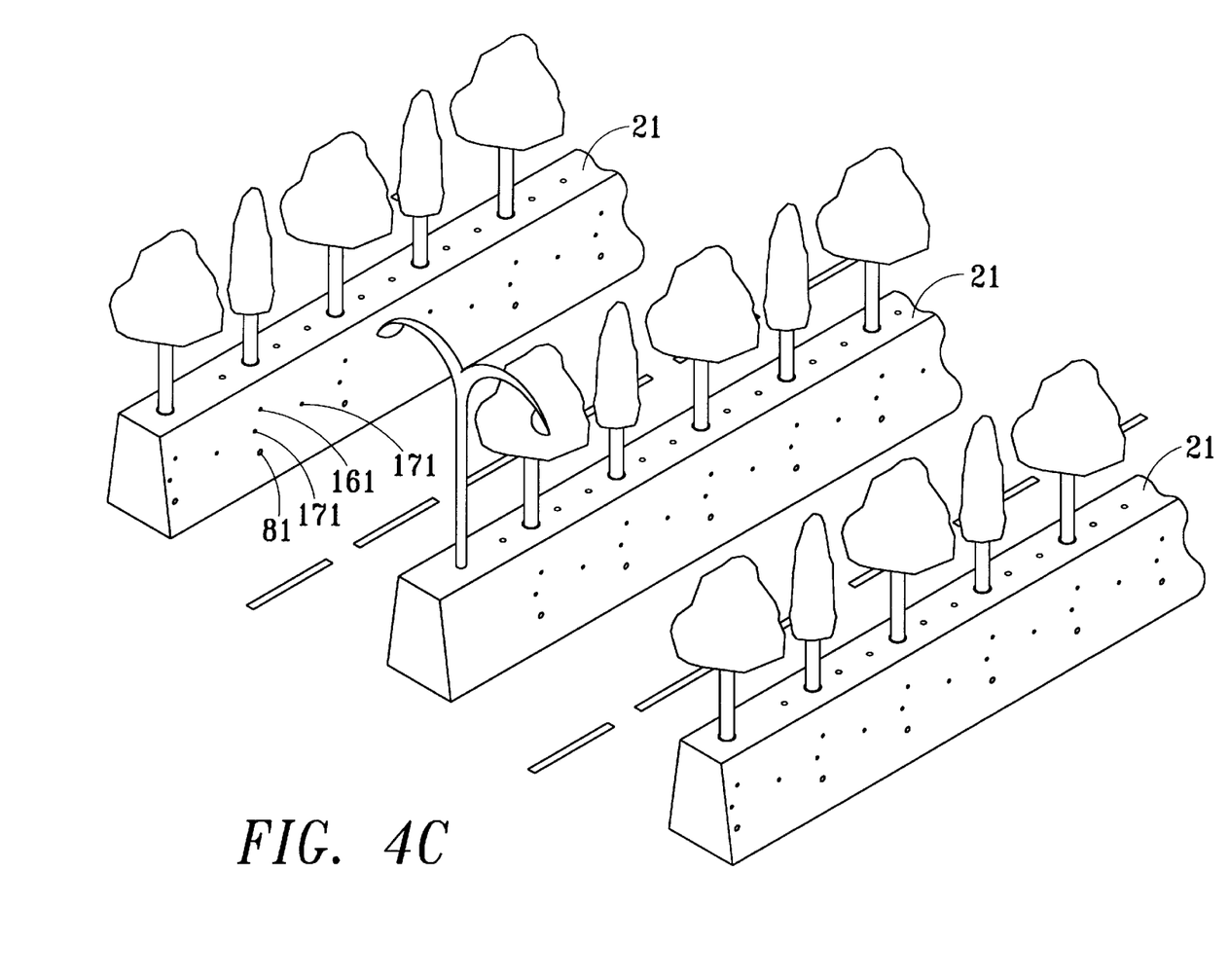
FIG. 4C is an isometric view showing an application of the stand of FIG. 4C.

Referring to FIGS. 4A, 4B, and 4C for details, the invention is based on the need for reinforced concrete structure greening and planting, taking into account the characteristics of plant growth. Therefore, it can bring the function of plant advantage fully into play under different conditions.

FIG. 4A illustrates the technique of planting greenery on a wall in this invention. The technique of wall planting and greening is to have 5–10 tools joined to an L-shape planting tube as a group and placed at an angle of between 10°–15°, inside the structural steel rods, along a horizontal line with #32 iron wire so that it can be connected horizontally. The horizontal line on the vertical steel rods of the reinforced concrete structure are marked with a black chalk line, and the structural steel rod is surrounded with the hollow plastic tube, and then the tool and T-shape base mount, along with the horizontal line, are connected. Afterwards, the hollow plastic tube is secured inside the structural steel rods at certain points with a #32 iron wire to the T-shape base mount. Tube wrapper (19) seals both ends of the hollow plastic tube. Then, the cylinder (1) is settled on the fixed frame (10), and the anchor (11) and handle (12) tied firmly at certain points on the structural steel rods with #32 iron wire. The module is braced in the planting direction to form a board (in the same way as an electric switch is installed on a house wall). Funnel (6) is connected to the snake-shape tube and extended to the pinnacle. The opening of funnel (61) is at the same level with the structural pinnacle, and is blocked up by a stopper. The funnel tube is tied to the structural steel rods with #32 iron wire. The L-shape sand-releasing tube (17), L-shape water level regulating hole (13), and air pipe regulating hole (132) are connected correspondingly to the L-shape water level adjusting tube (8) and L-shape air pipe (16), and are tied firmly on the structural steel rods with #32 iron wire, and then the opening of water adjustment (81) is joined to the plastic tube to the air pipe opening (161). The sand-releasing opening (171) is blocked with a stopper and the planting opening is also blocked in the same direction with a screw stopper. The module board is braced until the reinforced concrete structure is formed to shape and after finishing. All miscellaneous objects surrounding the planting opening are cleaned and the stopper around the planting opening is removed so that water can be poured into two-thirds of the cylinder. The soil is mixed with 20% limestone (the porosity of synthesized rocks is generally higher than that of common natural rocks), and 15% organic fertilizers are added to form guest soil. Then, water is added and mixed well until sticky to prevent limestone and organic fertilizers from floating in the water, or distributing unevenly, and to increase the soil aperture. The well-mixed guest soil from the L-shape planing opening is filled until it is 15 cm in height, and 3–5 enhanced chemical-based fertilizers (such as tree-like fertilizers) are added. Fill in guest soil continuously. The filled guest soil will become abundant and well stacked by gravity force. Therefore, the soil water capacity inside the cylinder can be saturated and provide enough nutrition for long time growth of plants. Afterwards, the pinnacle at the opening of funnel (61) and the water level adjustment (81) at the bottom are opened, and the stopper at the opening (161) of air pipe (16) is removed. Under atmospheric pressure, air enters the planting cylinder and drains the gravitational water which is not suitable for plant growth from the opening of the water adjustment, and the useful capillary water remains. Soil air inside the cylinder can be increased, and soil water capacity inside the cylinder can be saturated. The high-density sponge (9) inside the T-shape base mount is at this point full of water, as are the hollow horizontally and mutually trough plastic tubes. The tube inside forms an underground water supplied system, which provides water and nutrition for the plant to grow inside the reinforced concrete structure for a long time. Then, climbing plants are transplanted to the planting openings (4). Climbing plants include plants with air roots such as *Parthenocissus tricuspidata,* Ficus Pumila var Pumila, and Ficus Pumila var *awkeotsang,* or jelly bean seeds, which can grow climbing aerial roots to adhere to the wall because of the growth characteristic of climbing stem and adhering roots, and which can also absorb water and nutrition from air. Its root grows with an angle of 10°–15° downward. By coordinating with this invention, it takes the actual effectiveness of wall planting and greening into full play.

FIG. 4B shows the technique of stand greening and planting in this invention, and FIG. 4C applies the stand greening and planting in this invention as follows.

Figure 5A:
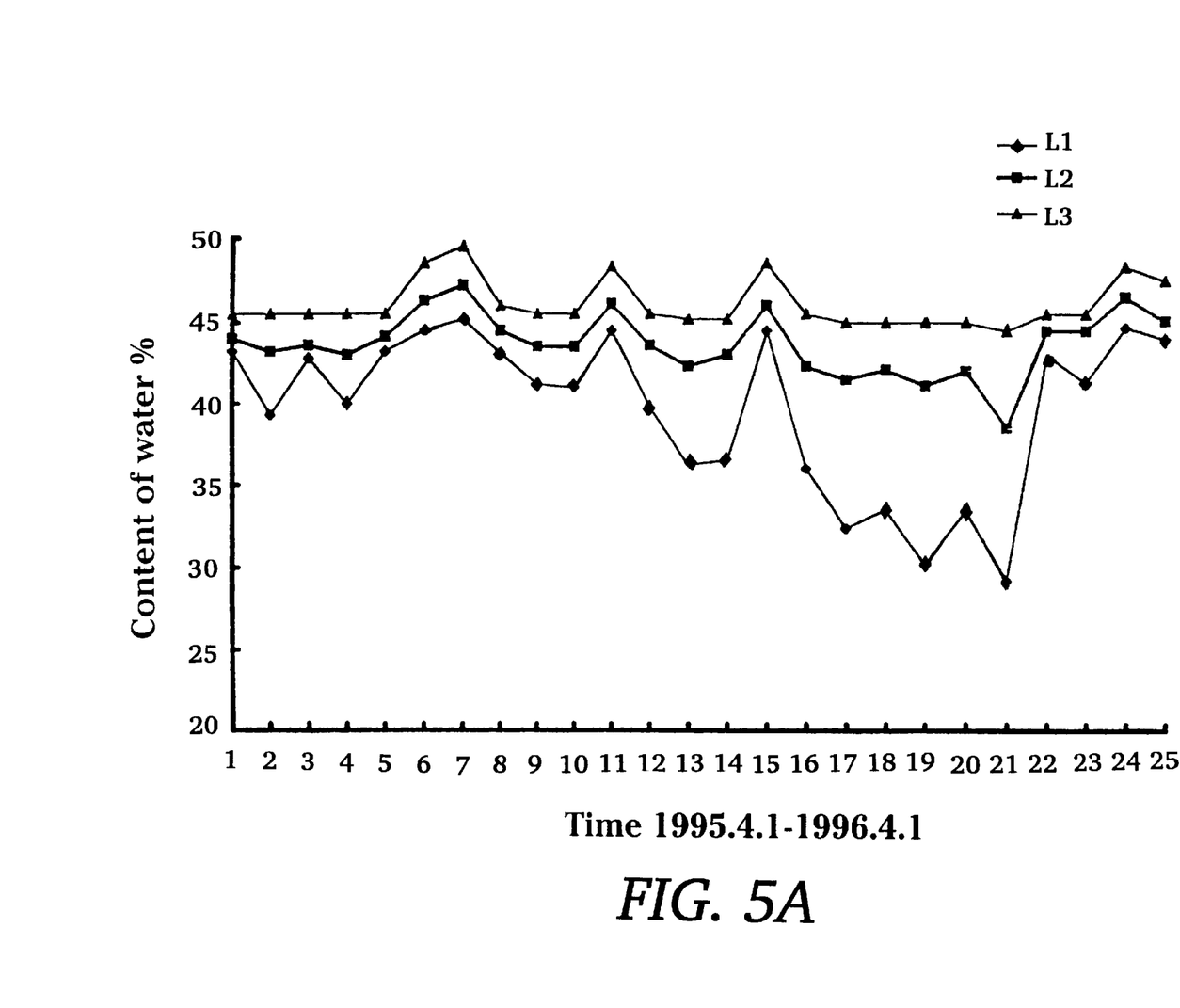
FIGS. 5A and 5B are graphs showing the long time change in water capacity of soil inside the preferred tool.
Figure 5B:
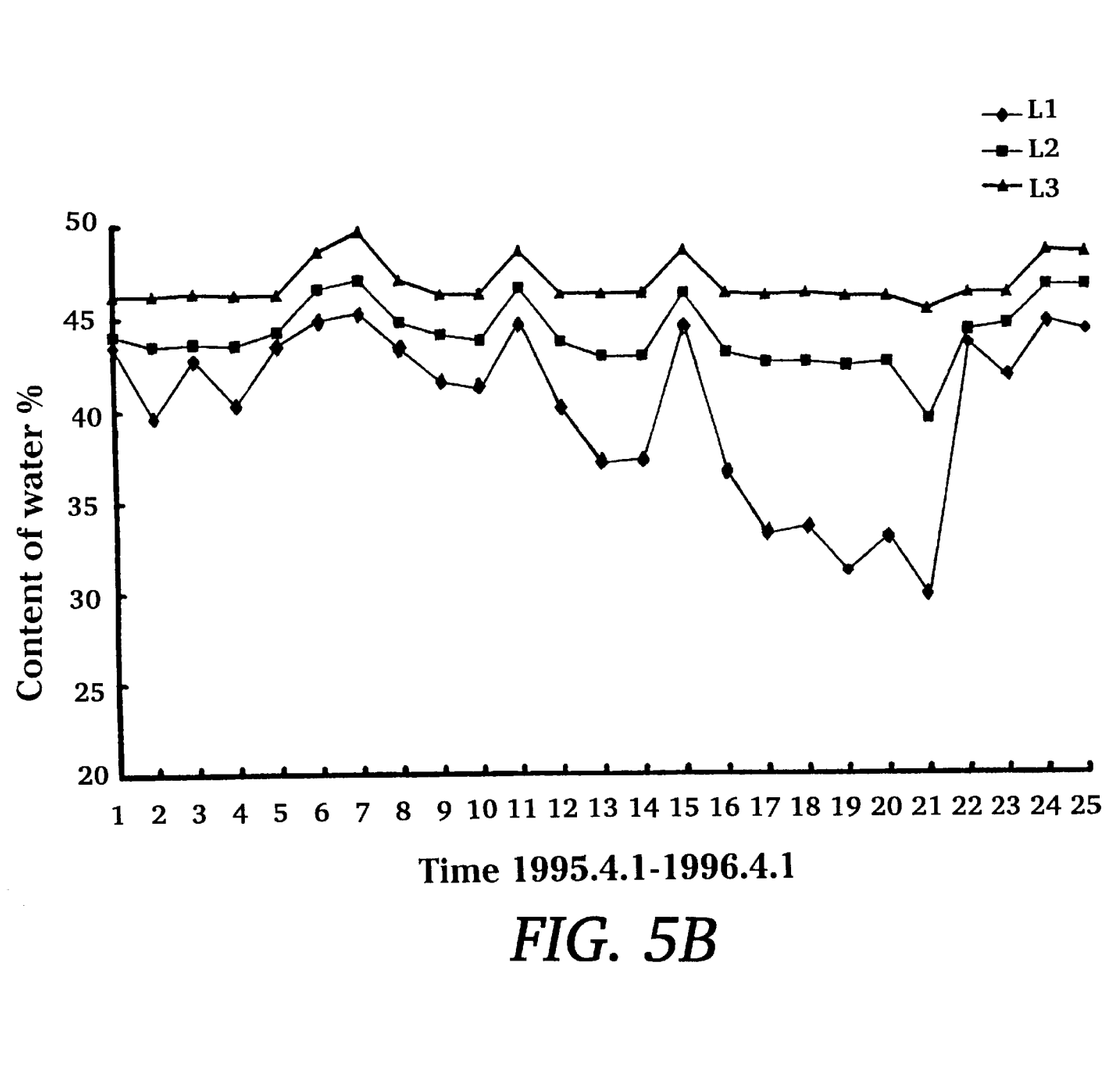

Take the 5–10 tools as a group. Put it into the structural steel rod vertically according to the designed points. Then, mark a horizontal line on the vertical steel rod of the reinforced concrete structure with a black chalk line, and surround the structural steel rod with the hollow plastic tube, and then join the tool, T-shape base mount, along the horizontal line. Afterwards, tie the hollow plastic tube inside the structural steel rods at certain points along the horizontal line with #32 iron wire so that it can be mutually secured to the T-shape base mount. Then, position cylinder (1) on the fixed frame (10), and tie the anchor (11) and handle (12) firmly at certain points on structural steel rods with #32 iron wire. Planting opening (4) is blocked by a stopper so that it will be at the same level with the pinnacle of the reinforced concrete structure. The snake-shape tube (7), which is connected to funnel (6), is pulled and extended toward a point that is 30 cm apart from both sides of one planting opening. Funnel (61) is at the same level with planting opening (4). Block the planting opening (4) and opening of funnel (61) and tie firmly around the structural steel rods with #32 iron wire. L-shape sand-releasing tube (17) and regulating hold of L-shape water level adjustment (13), and the regulating hole of air pip (132), are connected to L-shape water level adjustment tube (8) and L-shape air pipe (16) correspondingly, and tied with #32 iron wire firmly on the structural steel rods. Then join the opening of water adjustment (81) on the plastic tube to the air pipe opening (161). Block the sand-releasing opening (171) with a screw stopper. Brace the module board until the reinforced concrete structure is formed to shape and after finishing. Clean all miscellaneous objects surrounding the planting opening. Remove the stopper on the planting opening and pour in water to two-thirds the height of the cylinder. Mix soil with 20% limestone (the porosity of synthesized rocks is generally higher than that of common natural rocks) and 15% organic fertilizers to form guest soil. Add water and mix well until sticky, to prevent limestone and organic fertilizers from floating in the water, or distributing unevenly, and to increase the soil aperture. Fill the well-mixed guest soil from the planting curb opening until 15 cm in height, then add 3–5 enhanced chemical-based fertilizers (such as tree-like fertilizers). The filled guest soil will become abundant and well-stacked by gravity force. Therefore, the soil water capacity inside the cylinder can be saturated and provide enough nutrition for long time growth of the plant. Afterwards, open the pinnacle at the opening of funnel (61) and opening of water level adjustment (81) at the bottom and remove the stopper at the opening (161) of air pipe (16). Under atmospheric pressure, air enters the planting cylinder and drains the gravitational water which is not suitable for plant growth from the opening of the water adjustment, and the useful capillary water remains. Air in soil inside the cylinder can be increased, and soil water capacity inside the cylinder can reach saturation. The high density sponge (9) inside the T-shape base mount (2) is full of water, as are the hollow horizontal plastic tubes. The tube inside forms an underground water supplied system to provide water and nutrition for the plant to grow inside the reinforced concrete structure for a long time. Then the small trees and shrubs are transplanted to planting opening (4). FIGS. 5A and 5B, and Tables 1 and 2, show details of the result of change of soil water capacity inside the tool after long time testing of this invention. FIG. 5A shows the change in soil water during the stand greening and planting. FIG. 5B shows the change in soil water capacity during wall greening and planting. Tables 1 and 2 show the actual testing figures for soil water capacity inside this invention tool corresponding to FIGS. 5A and 5B with the percentage as basis. The method is as follows:

For original soil weight—take the soil weight after drying (100°–105° C. constant temperature for 25 hours), and measure the weight of water lost. Then, weight of water lost÷weight of dry soil×100. From Apr. 1, 1995 to Apr. 1, 1996, a hole was opened at 15, 30, and 60 cm on the tool with a teaspoon to get about 50 grams of soil as a sample for 15 days. The soil water was measured at intervals. L1 shows the testing results of sample soil at 15 cm height. L2 shows the testing results of sample soil at 30 cm height. L3 shows the testing results of sample soil at 60 cm height.

Although a preferred technique of wall greening and planting, and a preferred tool and technique of stand greening and planting, have been described in detail, the application and scope of the invention is not to be limited thereby.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

TABLE 1

| L1 | L2 | L3 |
|---|---|---|
| 43.2 | 44 | 45.5 |
| 39.3 | 43.2 | 45.5 |
| 42.8 | 43.6 | 45.5 |
| 40 | 43 | 45.5 |
| 43.2 | 44.1 | 45.5 |
| 44.5 | 46.3 | 48.5 |
| 45.2 | 47.2 | 49.5 |
| 43.1 | 44.5 | 46 |
| 41.2 | 43.5 | 45.5 |
| 41 | 43.5 | 45.5 |
| 44.5 | 46.1 | 48.3 |
| 39.8 | 43.6 | 45.5 |
| 36.2 | 42.3 | 45.2 |
| 36.5 | 43 | 45.2 |
| 44.5 | 46 | 48.5 |
| 36 | 42.3 | 45.5 |
| 32.4 | 41.5 | 45 |
| 33.5 | 42.1 | 45 |
| 30.2 | 41.1 | 45 |
| 33.4 | 42 | 45 |
| 29.2 | 38.5 | 44.5 |
| 43 | 44.5 | 45.5 |
| 41.3 | 44.5 | 45.5 |
| 44.7 | 46.5 | 48.3 |
| 44 | 45.1 | 47.5 |

TABLE 2

| L1 | L2 | L3 |
|---|---|---|
| 43.5 | 44.1 | 46.2 |
| 39.6 | 43.5 | 46.2 |
| 42.8 | 43.6 | 46.3 |
| 40.3 | 43.5 | 46.2 |
| 43.5 | 44.2 | 46.2 |
| 44.8 | 46.5 | 48.5 |
| 45.2 | 47 | 49.6 |
| 43.3 | 44.7 | 47 |
| 41.5 | 44 | 46.2 |
| 41.1 | 43.7 | 46.2 |
| 44.7 | 46.5 | 48.5 |
| 40 | 43.6 | 46.2 |
| 37 | 42.8 | 46.2 |
| 37.2 | 42.8 | 46.2 |
| 44.5 | 46.2 | 48.5 |
| 36.5 | 43 | 46.2 |
| 33.1 | 42.5 | 46.1 |
| 33.5 | 42.5 | 46.2 |
| 31.1 | 42.3 | 46 |
| 33 | 42.5 | 46 |
| 29.7 | 39.4 | 45.3 |
| 43.5 | 44.2 | 46.2 |
| 41.7 | 44.5 | 46.2 |

TABLE 2-continued

| L1 | L2 | L3 |
|---|---|---|
| 44.7 | 46.6 | 48.5 |
| 44.2 | 46.6 | 48.4 |

What is claimed is:

1. A tool for enabling plants to grow in a reinforced concrete structure, comprising:
   a cover plate having a top and a planting opening in said top of the cover plate;
   a cylindrical hollow plastic shell having a top, said top of the cylindrical hollow plastic shell being connected to said cover plate;
   a plurality of grooves in an interior surface of said hollow plastic shell, and a plurality of regulating openings in a side of said hollow plastic shell;
   a T-shaped connecting tube inserted into each of said plurality of regulating holes, said T-shaped tube including an upper section and a bottom section extending from a portion of the T-shaped tube that is inserted into said regulating openings;
   a snake-shaped tube joined to the upper section of each said T-shaped tube;
   a plastic funnel joined to each said snake-shaped tube;
   an L-shaped sand-releasing tube connected to the bottom section of each said T-shaped tube;
   a screw stopper for blocking an opening to the L-shaped sand-releasing tube;
   a plurality of L-shaped plastic tubes connected to a plurality of air pipe regulating holes located at intervals along the hollow plastic shell; and
   a fixed frame positioned outside the hollow plastic shell, said fixed frame being joined to the hollow plastic shell and welded to form a handle having an anchor on two sides; and
   a T-shaped base mount positioned at a base of said hollow plastic shell, said T-shaped base mount having a regulating hole formed therein, said regulating hole being connected to an L-shaped connecting tube, said T-shaped base mount further having a high density sponge positioned inside,
   wherein said fixed frame is arranged to anchor said tool in said reinforced concrete structure, said tool providing space, air, and water to enable a plant to grow in said reinforced concrete structure.

2. A tool as claimed in claim 1, further comprising an L-shaped planting tube added to said cover plate, and wherein a lower part of said cylindrical hollow plastic shell extends from a remainder of said hollow plastic shell at an angle of 105°.

* * * * *